United States Patent [19]

Aubert et al.

[11] Patent Number: 4,940,954

[45] Date of Patent: Jul. 10, 1990

[54] UNBALANCED QUADRATURE PSK MODULATOR-LIMITER

[75] Inventors: Donald E. Aubert, Mt. Laurel; You-Sun Wu, Princeton Junction; Vishnu W. Nerurkar, Planisboro, all of N.J.

[73] Assignee: General Electric Company, East Windsor, N.J.

[21] Appl. No.: 180,497

[22] Filed: Apr. 12, 1988

[51] Int. Cl.$^5$ .............................................. H03C 3/00
[52] U.S. Cl. ..................................... 332/103; 375/39; 375/54; 375/67
[58] Field of Search ................. 332/9 R, 16 R, 17, 21, 332/22, 23 R, 103; 375/39, 52, 54, 67

[56] References Cited

U.S. PATENT DOCUMENTS

| | | |
|---|---|---|
| 3,973,201 | 8/1976 | Andren . |
| 4,013,960 | 3/1977 | Godet . |
| 4,216,542 | 8/1980 | Hermesmeyer . |
| 4,267,591 | 5/1981 | Wissel et al. . |
| 4,276,521 | 6/1981 | Davidheiser . |
| 4,581,586 | 4/1986 | Rubin . |
| 4,602,227 | 7/1986 | Clark et al. . |
| 4,635,006 | 1/1987 | Praba .. |
| 4,680,775 | 7/1987 | Exarque et al. . |
| 4,736,170 | 4/1988 | Wu et al. .......................... 332/22 X |

OTHER PUBLICATIONS

"Conventional and New Applications for the Quadrature IF Microwave Mixer", by Neuf et al., *Microwave Journal*, Jan. 1973, pp. 99–109.

Technical Note "Modulator Highly Suppresses Carrier and Harmonics", by Torok, *Microwaves*, Nov. 1978, p. 96.

"Symmetrical Coupler Reduces Phase Error", by Ho et al., *Microwaves*, Apr. 1981, pp. 82–84.

*Primary Examiner*—Robert J. Pascal
*Attorney, Agent, or Firm*—William H. Meise

[57] ABSTRACT

An unbalanced quadrature phase-shift keyed UQPSK modulator modulates two information signals onto mutually quadrature components of a carrier. If the carrier components differ from an exact quadrature relationship by an error angle, crosstalk orr distortion is introduced. The effects of such an error are ameliorated by a limiter following the modulator.

13 Claims, 6 Drawing Sheets

UNBALANCED QUADRATURE PSK MODULATOR-LIMITER

The Government has rights in this invention under Contract No. NA84-DSC-00125 with the Department of Commerce.

This invention relates to improving the crosstalk of unbalanced quarternary phase shift keyed modulators, and more particularly to such modulators in which an amplitude limiter is used.

BACKGROUND OF THE INVENTION

Phase-shift keyed (PSK) transmissions are a widely used and reliable form of communication. It is well known that two binary (two-state) PSK signals can be summed or superposed, with a 90° relative phase shift between the carriers, to form quarternary phase shift keyed signals (QPSK), so that the single sum carrier can be modulated by two independent information signals.

FIG. 1 illustrates in block-diagram form a modulator 10 as described in an article entitled "Conventional and New Applications for the Quadrature IF Microwave Mixer," by Neuf et al., published at pp. 99–109 of the January, 1983 issue of Microwave magazine. In the arrangement of FIG. 1, a radio frequency (RF) carrier which is to be QPSK modulated is applied to an input port 12 of a 3 dB power divider 14. Such power dividers are well known, and are given names such as "0°, 3 dB hybrid." The power divider has a characteristic such that signal applied to the common port divides into two ideally identical signals at its two output ports 16 and 18. As a matter of interest, if equal-power, equal-phase signals are applied as inputs to ports 16 and 18, their sum appears at port 12, but to the extent that the signals applied as inputs to ports 16 and 18 are not identical, the difference does not appear at common port 12, but instead goes to a reject port (not illustrated) where it is dissipated as heat.

In modulator 10 as illustrated in FIG. 1, the equal-amplitude, equal-phase signals produced at output ports 16 and 18 of power divider 14, in response to the application of a carrier to its input port, are individually applied by conductors 44 and 46 to a first input port 48 of a first mixer 20 and to a first input port 50 of a second mixer 22. Mixer 20 includes a second input port 24 which is adapted to be coupled to receive a first information signal, referred to as an in-phase (I) signal, and mixer 22 also includes a second input port 26 which is adapted to be coupled to receive a second, independent, information signal, referred to as a quadrature (Q) signal. The designation of I and Q applied to the information signals does not refer to any relationship between the information signals themselves, but as described below refers to the result of modulation. Mixers 20 and 22 are each operated in a biphase keying mode. The operation of a doubly balanced mixer as a biphase keyer is described below in relation to FIG. 2.

The biphase keyed output signal from mixer 20 appears at output terminal 28 of mixer 20 and is applied by way of a conductor 52 to an input port 34 of a quadrature 3 dB hybrid or directional coupler 32. The biphase keyed output signal from mixer 20 appears at output terminal 30 of mixer 22 and is applied by way of a conductor 54 to an input port 36 of coupler 32. A "reject" load 42 is coupled to an output port 40 of coupler 32 for dissipating unwanted signal. Three dB coupler 32 is of the well-known type described for example in U.S. Pat. No. 4,602,227 issued Jul. 22, 1986 to Clark et al.

This type of coupler includes two transmission lines in close proximity to each other, which interact over a length of one fourth wavelength at a frequency within an operating band of frequencies. One transmission line is represented by the line joining ports 34 and 40 of coupler 32 of FIG. 1, and the other transmission line is represented by the line joining ports 36 and 38. This type of coupler may be used at any frequency, but finds most common use in the frequency range of about 100 Megahertz (MHz) to 10 Gigahertz (GHz). A salient feature of coupler 32 is that signals applied to port 34 are divided into two portions, one of which is coupled to port 38 with half amplitude (−3 dB) and with reference phase, and the other of which is coupled port 42, also with half amplitude, but with the reference phase plus 90°, due to the length of the quarter wavelength transmission line. Similarly, signals applied to port 36 are divided into two parts and coupled to port 40 with half amplitude and reference phase, and to port 38 with half amplitude and with reference phase plus 90°. When equal-amplitude, equal-phase signals are applied to ports 34 and 36 of coupler 32, half the total signal power is coupled to port 40 and to reject load 42, and the other half of the total signal power appears at output port 38 as a vector sum signal. Other coupler structures provide equivalent performance over other frequency ranges.

FIG. 2 is a schematic diagram of doubly balanced mixer 20. Mixer 22 is, of course, identical in structure. Elements of FIG. 2 corresponding to those of FIG. 1 are designated by the same reference numbers. Input conductor 44 is coupled by way of port 48 to one end of a primary winding 210' of a transformer 210. The other end of primary winding 210' is grounded. Carrier signal illustrated as an amplitude versus time sinusoidal waveform 240 is coupled to a secondary winding 210" which has a center tap 212. Center tap 212 is connected to second input port 24 for receiving digital information signal illustrated as a voltage amplitude versus time step waveform 242, which is illustrated as having a value more positive than zero volts times prior to a time T0, and a value more negative than zero volts after time T0. Waveform 242 represents one transition of a binary data signal from a logic one level at times preceding time T0 to a logic zero level at times after time T0. The ends of secondary winding 210" are connected to node points (nodes) 214 and 216. Another transformer designated generally as 220 includes a secondary winding 220", one end of which is grounded and the other end of which is connected by way of output port 28 to conductor 52. Secondary winding 220" is driven by a primary winding 220' having a grounded center tap 222. The ends of secondary winding 220' are connected to nodes 224 and 226. A first diode 228 has its anode connected to node 214 and its cathode connected to node 24. A second diode 234 has its anode connected to node 216 and its cathode to node 226. Third and fourth diodes 230 and 232 have their anodes coupled to nodes 224 and 226, respectively, and their cathodes connected to nodes 216 and 214, respectively.

In operation of mixer 20, sinusoidal carrier illustrated as 240 is applied to primary winding 210' and is coupled by secondary winding 210" to appear across or between nodes 214 and 216. Also during operation, binary data or information signal illustrated as waveform 242 is applied to terminal 24 relative to ground. Before time T0, voltage 242 has a value more positive than ground, i.e. a positive voltage. The positive voltage forward-biases diodes 228 and 234, and the bias current flows through winding 210″, forward-biased diodes 228 and 234, and through winding 220′ to ground. Diodes 230 and 232 are reverse-biased by the applied positive information signal and represent an open circuit. With diodes 228 and 234 forward biased and therefore conductive, a connection is established between node 214 and node 224, and between nodes 216 and 226. Thus, before time T0, the RF carrier produced at nodes 214 and 216 is coupled to nodes 224 and 226, and is therefore applied with a first or reference polarity or phase to primary winding 220′. The transformed carrier is coupled from secondary winding 220″ to output port 28 with reference polarity, as illustrated by that portion of waveform 246 prior to time T0, which in this case is denoted 0°. After time T0, diodes 228 and 234 become reverse biased and therefore effectively become open circuits, while diodes 230 and 232 are biased into conduction. With diodes 230 and 232 conductive, conduction paths are established between node pairs 214, 226; 216, 224. After time T0, therefore, the RF carrier appearing between nodes 214 and 216 continues to be coupled to nodes 224 and 226, but with a reversal of polarity. The output RF carrier coupled to output terminal 28, therefore, makes a reversal of polarity (or assumes a 180° relative phase) at time T0, as illustrated by amplitude-time waveform 246.

If the I and Q digital information signals of FIG. 1 are binary, taking on logic high (1) and logic low (0) states, there are a total of only four possible combinations of states of information I,Q: 1,1; 1,0; 0,1; and 0,0. If the information state is 1,1, the relative phase of the RF signal applied to "through" input port 34 of coupler 32 is 0°, which results in a 0° reference phase at output port 38 for one component of the sum output signal. For a 1,1 information state, the relative phase of the carrier applied to input terminal 36 is also 0°, which as mentioned above is coupled to output port 38 with a 90° phase delay attributable to the quarter wavelength transmission line. Since the carrier applied to input ports 34 and 36 of coupler 32 were originally each attenuated by 3 dB by passage through power divider 14, and since mixers 20 and 22 are identical and substantially lossless, the carriers as applied to ports 34 and 36 are equal in amplitude, and each has half the power of the original carrier applied to input terminal 12. The vector sum of two equal-amplitude carriers with a relative 90° phase shift appears at output port 38 of coupler 32 of FIG. 1, and is illustrated as vector 310 of FIG. 3. Vector 310 is designated 1,1 to indicate the information state which it represents.

In FIG. 3, the 0° axis represents the phase of an output from port 38 of coupler 32 of FIG. 1 with input port 36 disconnected from a source (and terminated in a matched impedance), and with a logic 1 input applied to port 24 of mixer 20. The 0° axis is labelled I, since the state of the Q information is irrelevant in producing the 0° output. Similarly, the +90° axis of FIG. 3 represents the phase of an output from port 38 of coupler 32 of FIG. 1 with port 34 disconnected (and terminated), and with a logic 1 state at input port 26 of mixer 22. Thus, the +90° axis is controlled only by the state of the input Q information signal, and is so designated.

If the logic state applied to modulator 10 of FIG. 1 is 0,1, this means that in FIG. 3 the phase of the I signal is reversed (to 180° on the I axis), and the phase of the Q signal is not reversed (90° on the Q axis). The 0,1 information state is therefore represented by sum vector 312, and represents the phase of the sum signal at output port 38 of FIG. 1. Similar analysis allows representation of the 0,0 information state as vector 314 and of the 1,0 information state as vector 316. Vectors 310-316 form a symmetrical crossed pattern with 90° angles therebetween.

In sum, QPSK modulator 10 of FIG. 1 receives RF carrier, I and Q digital information signals, and generates an RF carrier having a power decreased by 3 dB (due to dissipation in reject load 42) plus stray dissipation losses, in which the relative phase is as represented in FIG. 3 with vector pairs 310, 314 in quadrature to vector pairs 312, 316. If the information signals have different data rates, as for example if the I signal represents video and the Q signal represents audio, QPSK modulation leads to relative degradation of the bit error rate (BER) of the high data rate channel relative to the low data rate channel. The BER can be equalized by increasing the power in the channel carrying the higher data rate information commensurate with its higher bandwidth and thus offset higher received noise relative to the power of the low data rate channel. Thus, the higher-rate I channel would have a higher-power carrier than the lower-rate Q channel. This type of modulation is known as unbalanced quarternary phase shift keying (UQPSK), also known as unbalanced quadrature phase-shift keying and unbalanced quadri-phase shift keying.

FIG. 4 is a block diagram of a UQPSK modulator 400 as described in U.S. Pat. No. 4,216,542, issued Aug. 5, 1980 to Hermesmeyer. As described by Hermesmeyer, the carrier to be modulated is applied by port 412 to an input port 498 of a quadrature hybrid coupler 414, which produces relatively phase-shifted ∠0°, ∠90° signals at its output ports 416, 418. Six dB attenuator pads (not illustrated) are included in the output ports of coupler 414 for isolation and stability. A phase adjuster 456 allows setting of a precise 90° phase relationship. The two relatively phase shifted and attenuated signals are applied to input ports 448 and 450, respectively, of biphase modulators 420, 422, respectively. The modulated signals are applied from the biphase modulators to input terminals 434 and 436 of a (0°) combiner 432 and combined without further differential phase shift to produce QPSK modulated signal. A selectable attenuator 458 in the I channel allows setting of the power ratio Q/I to produce UQPSK.

Disregarding the power loss in coupler 414 of FIG. 4, which is equal for both power-divided carriers at output ports 416 and 418, and also disregarding losses in phase shifter 456, equal-amplitude, relatively 90° phase shifted carrier signals are applied to input ports 448, 450 of biphase modulators 420, 422, respectively, of FIG. 4. Therefore, assuming that attenuator 458 is set to 0 dB (no loss), then equal-amplitude, quadrature biphase modulated signals are applied to the input ports 434 and 436 of combiner 432. Combiner 432 sums the signals to produce the vector pattern illustrated in FIG. 3 at output port 438, but with reduced amplitude due to the 6 dB attenuators in coupler 414, and also due to the inherent loss of combiner 432. Such combiners ordinarily have an inherent loss of 3 dB. Thus, modulator 400 has a loss of 9 dB plus extra component losses between the RF input at port 412 and the output at port 438, even with attenuator 458 set to 0 dB.

When the attenuation of attenuator 458 is increased (loss is increased), the amplitude of the 0° modulated carrier component applied to input port 434 of combiner 432 is reduced. In the 1,1 information signal state, therefore, the magnitude of the 0° component is reduced relative to the +90° component, with the resulting vector, illustrated as 510 in FIG. 5, being at a selected angle $\phi$ which is more than 45° from the 0° axis. As the attenuation of attenuator 458 (FIG. 4) increases, angle $\phi$ increases. The corresponding angles of the other vectors 512, 514 and 516 also change in a corresponding manner. In particular, the phase of vector 512 is $180° - \phi$, the phase of vector 514 is $180° + \phi$, and the phase of vector 516 is $360° - \phi$. Naturally, if attenuator 458 were placed in-line with conductor 454 instead of in the illustrated location, angle $\phi$ would be less than 45°, and would decrease in response to an increase of attenuation.

While modulator 400 of FIG. 4 is capable of generating UQPSK modulated signal, it is disadvantageous by comparison with QPSK modulator 10 of FIG. 1, in that for equal-amplitude RF carrier inputs, the UQPSK signal produced by modulator 400 has a much lower amplitude, and will therefore suffer a worse BER than the QPSK signal of modulator 10. This result may be corrected by providing a power amplifier at the output of modulator 400 and thus have worse reliability. However, in a system in which the power level at the RF input port of the modulator was already adequate, as for example in the hundreds of watts, the additional loss of UQPSK modulator 400 by comparison with QPSK modulator 10 results in a heat rejection problem, and also requires a second high power amplifier, which may be costly and unreliable.

Hermesmeyer's attenuator 458 of FIG. 4 could be used in Neuf's modulator 10 of FIG. 1, as by placing attenuator 453 of FIG. 4 between ports 28 and 34 of the FIG. 1 arrangement. UQPSK modulation results with this arrangement, but additional power is dissipated in the attenuator, the output signal level drops in the I channel, and the overall BER gets worse rather than better.

The arrangement of modulator 600 of FIG. 6 is similar to that of modulator 10 of FIG. 1, and elements of FIG. 6 corresponding to those of FIG. 1 are designated by the same reference numbers. Modulator 600 differs from modulator 10 in that the output 90° coupler 632 is unbalanced, rather than balanced. This has the salient advantage that the energy coupled from one of input ports 34 or 36 to output port 38 is greater in amplitude than it would be if a 3 dB hybrid (such as hybrid 32 of FIG. 1) were used. Thus, loss from input port 34 to output port 38 can be by a through path (hence port 34 can be a "through" input port) having less than 3 dB loss. For example, a 7 dB unbalanced coupler has a theoretical loss between ports 34 and 38 of only about 0.8 dB. Assuming the stray losses to be 0.2 dB, the through-port-to-output-port loss is only 1 dB, as opposed to 3.2 dB for a 90°, balanced hybrid. Thus, there is a 2 dB increase in useful power in this situation which arises from the use of a 7 dB unbalanced coupler rather than a 3 dB hybrid together with attenuators. The signal component applied to second input port 36 appears at the output port 38 7 dB below the output level of the through-path component.

FIG. 7 is a vector diagram representing the output phases of modulated carrier appearing at port 38 of modulator 600 of FIG. 6, with an adjustable directional coupler such as that described in U.S. Pat. No. 4,736,170 to a value of 7 dB. As illustrated in FIG. 7, the 1,1 information state is represented by a vector 710 which makes an angle of 26.6° with the 0° reference axis, and the 0,1 state is represented by a vector 712 making an angle of 153.4° with the 0° axis. The 0,0 and 1,0 information states are represented by vectors 714 and 716, respectively.

Any slight imbalance in the structure which results in other than a 90° phase shift or quadrature relationship between the phases of the two modulated carriers results in phasors which define a parallelogram as illustrated in FIG. 8, rather than a rectangle as illustrated in FIG. 7. This introduces a distortion which a receiver interprets as crosstalk between the I and Q channels, which tends to increase the BER. The crosstalk is proportional in magnitude to the size of the phase error $\phi$. It is desirable to ameliorate the effects of deviation of the phase of the mutually quadrature carriers.

SUMMARY OF THE INVENTION

A UQPSK modulator modulates first and second information signals onto mutually quadrature components of a carrier. Any deviation of the carrier components from exact quadrature may result in cross-modulation or distortion. A limiter is coupled to amplitude limit the modulated carrier for reducing the distortion.

DESCRIPTION OF THE INVENTION

Figure 1:
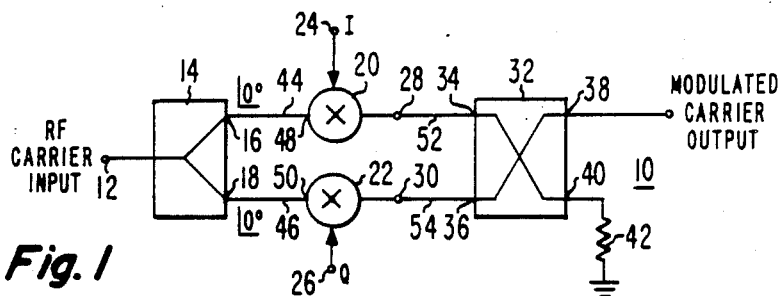
FIG. 1 is a simplified block diagram of a prior art QPSK modulator including a pair of biphase modulators.
Figure 2:
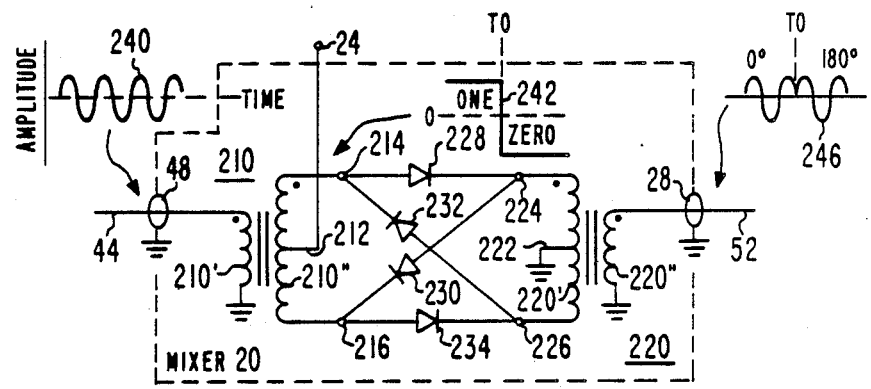
FIG. 2 is a simplified schematic diagram of one of the biphase modulators of FIG. 1.
Figure 3:
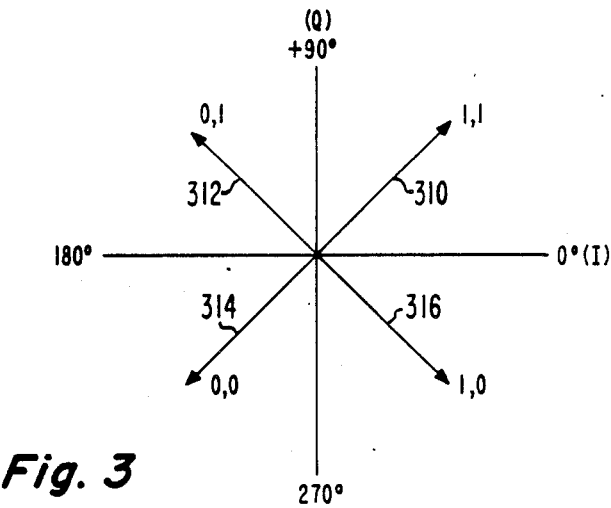
FIG. 3 is a vector diagram aiding in understanding the operation of the QPSK modulator of FIG. 1.
Figure 4:
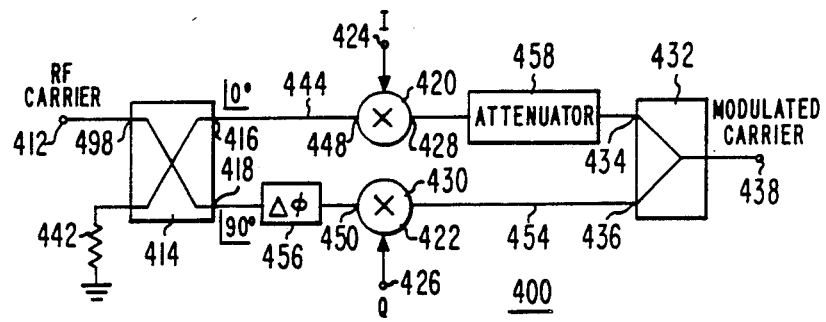
FIG. 4 is a simplified block diagram of a prior art UQPSK modulator.
Figure 5:
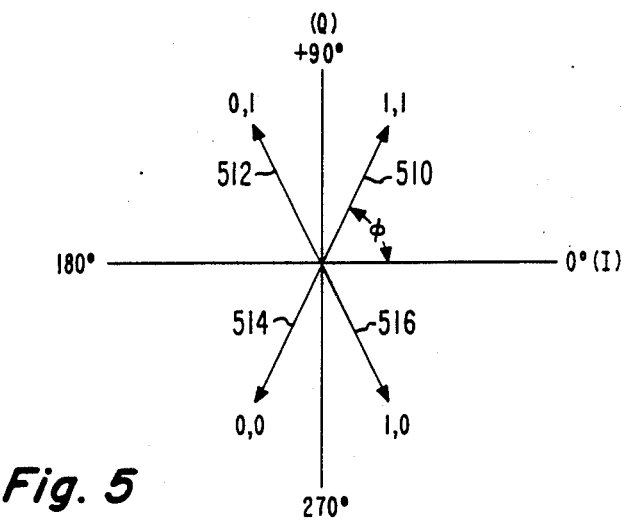
FIG. 5 is a vector diagram aiding in understanding the operation of the modulator of FIG. 4.
Figure 6:
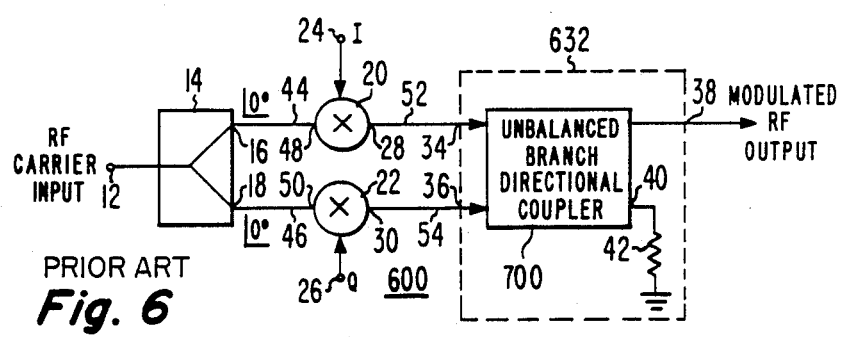
FIG. 6 is a simplified block diagram of another UQPSK modulator including an unbalanced hybrid coupler.
Figure 7:
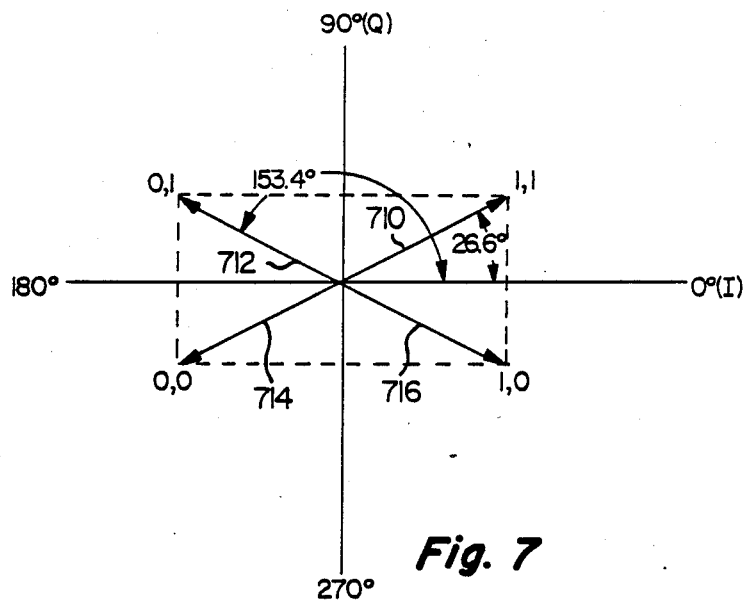
FIG. 7 is a vector diagram aiding in understanding the operation of the modulator of FIG. 6 and illustrating an ideal rectangle.
Figure 8:
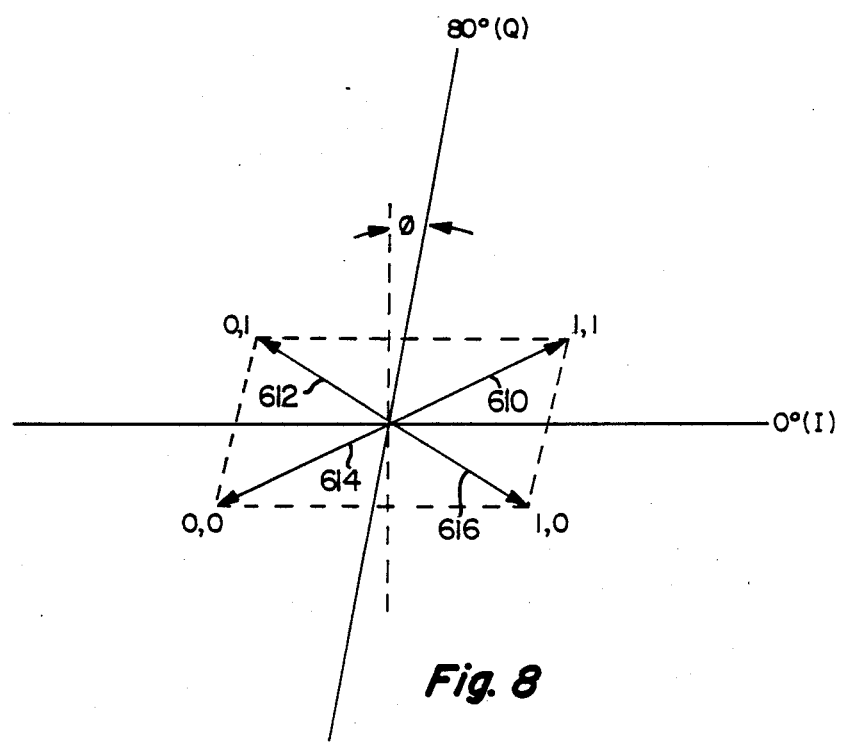
FIG. 8 is a vector diagram aiding in understanding the effect of a phase error in generating a parallelogram.
Figure 9:
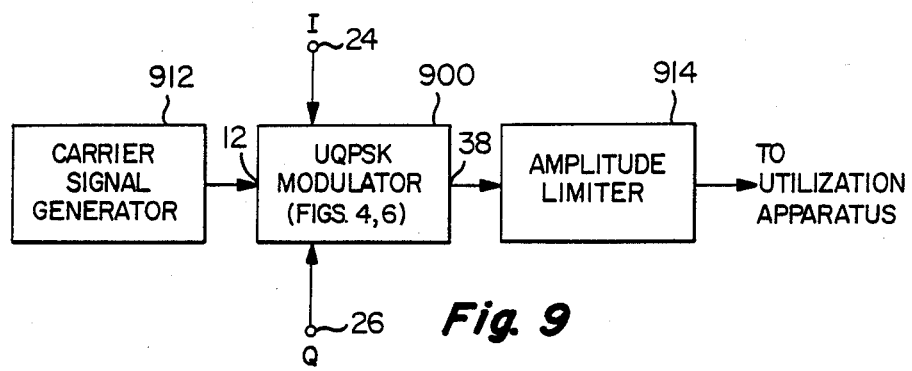
FIG. 9 is a block diagram of an arrangement according to the invention including an amplitude limiter for reducing the distortion introduced by a phase error.

FIG. 9 is a block diagram of an arrangement according to the invention for correcting the phase error described in conjunction with FIG. 8, for improving crosstalk or distortion. In FIG. 9, a UQPSK modulator 900 which may be similar to that described in conjunction with FIG. 4 or FIG. 6, or which may be of any other conventional type, receives at its input terminal 12 an unmodulated carrier signal produced by a carrier signal generator 912. Modulator 900 also receives information signals designated I and Q from terminals 24 and 26, respectively, and produces at an output terminal 38 a UQPSK modulated signal, as described above. As mentioned, any phase error $\phi$ from orthogonality of the carrier components onto which the I and Q signals are modulated may result in crosstalk or distortion of the information when it is demodulated at the receiver (receiver not illustrated). This problem is ameliorated by an amplitude limiter 914, which, as described below, tends to correct the phase error.

Figure 10:
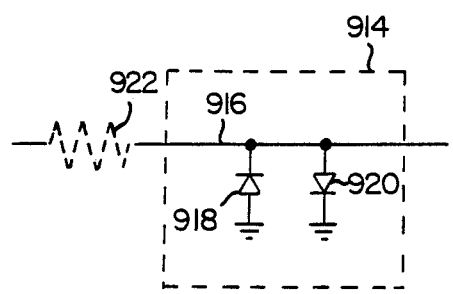
FIG. 10 is a simplified schematic diagram which illustrates a diode amplitude limiter.

FIG. 10 illustrates one conventional amplitude limiter using antiparallel-connected diodes. In FIG. 10, amplitude limiter 914 includes a through conductor 916, together with antiparallel diodes 918 and 920 connected between conductor 916 and ground. As is well known to those skilled in the art, diodes 918 and 920 have a characteristic which includes a relatively constant-voltage portion which coacts with the source impedance, represented in FIG. 10 by a phantom resistor 922, to limit the maximum output voltage to a value near the diode forward offset voltage.

FIG. 11 is a simplified schematic diagram of an amplifier-limiter. The amplifier-limiter includes an isolator 1194 and a cascade of two stages 1196, 1198 of amplifier-limiters each using a gallium arsenide FET. These FETs are Hewlett-Packard type 2201, which are particularly advantageous for operation at frequencies in the range of 7 to 9 GHz.

Figure 11A:
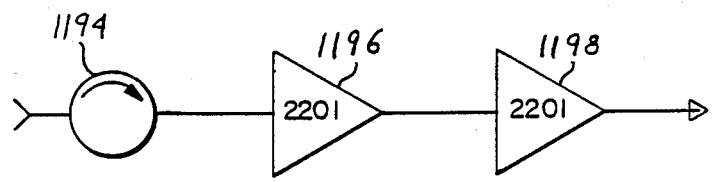
FIG. 11a is a simplified schematic diagram which illustrates a FET amplifier type of amplitude limiter with isolators for impedance control.
Figure 11B:
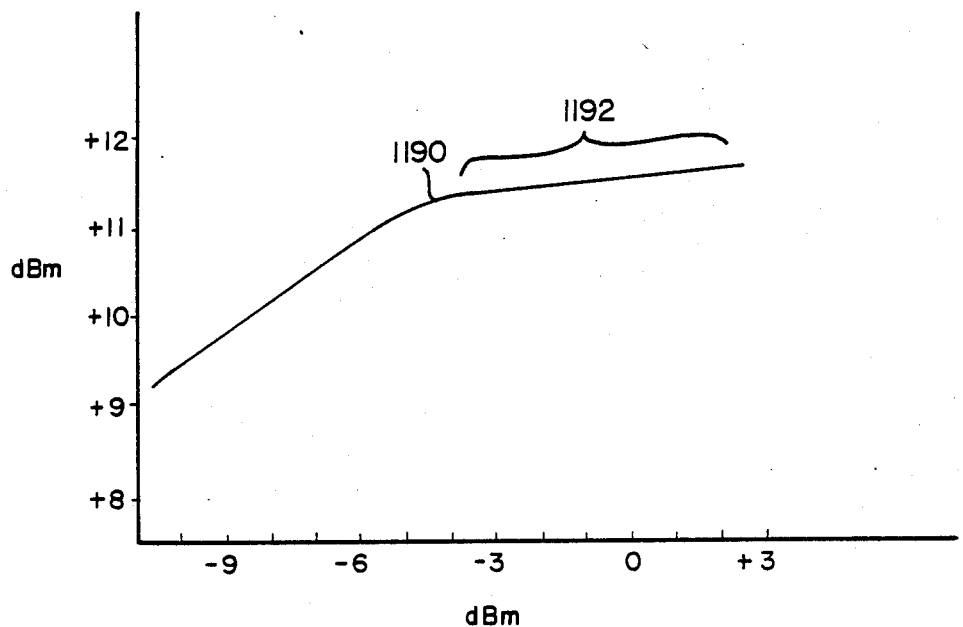
FIG. 11b is a plot illustrating its transfer characteristics.

FIG. 11b is a plot of the characteristics of a limiting amplifier such as that described in junction with FIG. 11a. In FIG. 11b, plot 1190 includes a first portion in which the gain is substantially constant over the input signal amplitude range of $-11$ dBm to $-4.5$ dBm. Amplifiers of this sort are well known in the art.

Figure 12A:
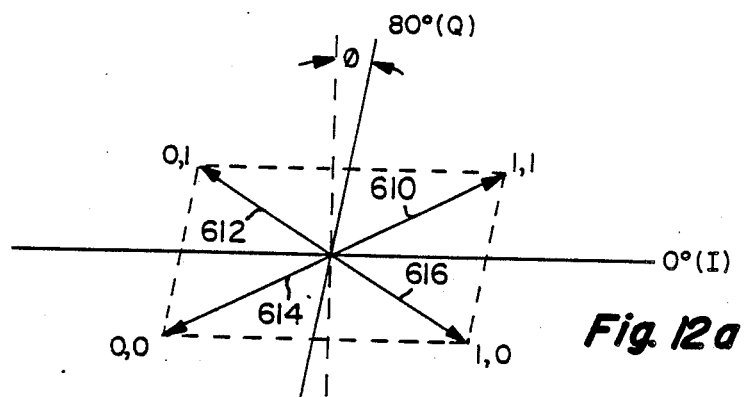
FIGS. 12a and 12b illustrate a parallelogram, the superposition of a limiting circle thereon, and the resulting more rectangular characteristic.
Figure 12B:
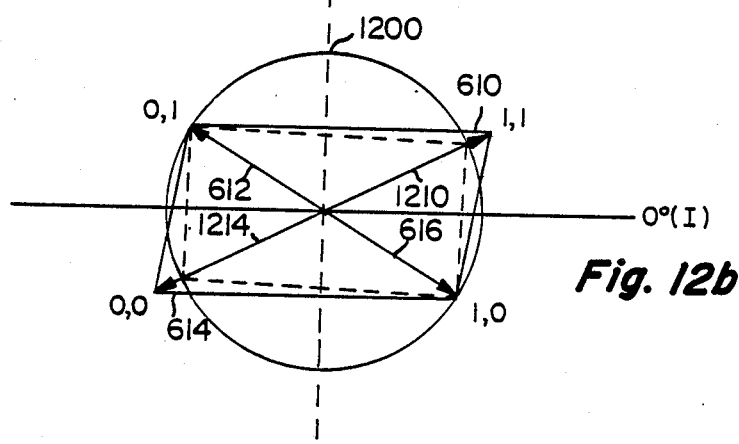

FIG. 12a reproduces FIG. 8 for convenience. FIG. 12b illustrates the effect of limiter 914 of FIG. 9 on the distorted phasors of FIG. 12a. In FIG. 12b, superimposed circle 1200 represents the limiter function. The limiter function 1200, as illustrated in FIG. 12b, has a radius which equals the length of shorter phasors 612 and 616, and therefore has little or no effect on these phasors. However, the radius of circle 1200 is less than the length of phasors 610 and 614, and therefore limits the portion of phasors 610 and 614 without circle 1200, which leaves as a remainder phasors 1210 and 1214 within limiting circle 1200. As illustrated in FIG. 12b, the Figure defined by phasors 612, 616, 1210, and 1214 defines a rectangle illustrated by dotted lines. Thus, the Figure defined by the phasors is substantially identical to that which would occur if error angle $\phi$ of FIG. 12a were 0°.

What is claimed is:

1. An apparatus for accurately producing unbalanced quadri-phase shift keyed modulated signals, including an unbalanced quadri-phase shift keyed modulator adapted to be coupled to a source of carrier signal and to sources of first and second information signals to be modulated in unbalanced quadrature onto said carrier for producing unbalanced quadri-phase shift keyed signals, said modulator tending to produce crosstalk if said quadrature relationship is disturbed, wherein said modulator comprises:

in-phase power splitting means including an input port adapted to receive said carrier signal to be modulated, and also including first and second output ports at which equal-amplitude mutually in-phase first and second carriers are generated in response to application of said unattenuated carrier signal to said input port;

first biphase modulation means coupled to said first output port of said power splitting means for receiving said first carrier therefrom, and also including an information input port adapted to be coupled for receiving said first information signals, for biphase modulating said first carrier with said first information signals for producing first modulated carrier signals;

second biphase modulation means coupled to said second output port of said power splitting means for receiving said second carrier therefrom, and also including an information input port adapted to be coupled for receiving said second information signals, for biphase modulating said second carrier with said second information signals for producing second modulated carrier signals;

a 90°, unbalanced hybrid coupler including first and second input ports coupled to said first and second amplitude modulation means, respectively, and also including an output port, for coupling said first modulated carrier signals from said first input port of said hybrid coupler to said output port of said hybrid coupler with reference amplitude and phase, and for coupling said second modulated carrier signals from said second input port of said hybrid coupler to said output port of said hybrid coupler with an amplitude different than said reference amplitude and with a relatively quadrature phase shift, and for vectorially summing the unequal-amplitude, mutually-quadrature first and second modulated carrier signals to produce said unbalance quadri-phase shift keyed signals, said apparatus further comprising:

an amplitude limiter coupled to said modulator for limiting the amplitude of said unbalanced quadri-phase shift keyed signals for reducing said tendency to produce crosstalk.

2. An apparatus according to claim 1, wherein said first and second biphase modulation means comprise balanced mixers.

3. An apparatus according to claim 2, wherein said balanced mixers are doubly balanced.

4. An apparatus according to claim 1, wherein said hybrid coupler has an amplitude characteristic such that said amplitude difference is 7 dB, and said unbalanced quadri-phase shift keyed signal makes a phase angle of approximately 27° with said first modulated carrier signal component under a first condition of modulation, and a phase angle of approximately 153.4° with said first modulated carrier signal component under a second condition of modulation.

5. An apparatus according to claim 1, wherein said unbalanced hybrid coupler comprises:

a four-port branch directional coupler; and a matched termination coupled to one of said four ports.

6. An apparatus according to claim 5, wherein said first and second biphase modulation means each comprise a balanced mixer.

7. An apparatus according to claim 5, wherein said amplitude difference is 7 dB.

8. An apparatus according to claim 5, wherein said phase difference deviates from 90°, thereby tending to produce said crosstalk.

9. An apparatus according to claim 8, wherein said amplitude limiter comprises an amplifier.

10. An apparatus according to claim 9, further comprising an isolator coupled between said amplifier and said modulator.

11. An apparatus according to claim 1 further comprising an isolator coupled between said modulator and said limiter.

12. An apparatus for accurately producing unbalanced quadri-phase shift keyed modulated signals, including an unbalanced quadri-phase shift keyed modulator adapted to be coupled to a source of carrier signal and to sources of first and second information signals to be modulated in unbalanced quadrature onto said carrier for producing unbalanced quadri-phase shift keyed signals, said modulator tending to produce crosstalk if said quadrature relationship is disturbed, wherein said modulator comprises:

a summing coupler including first and second input ports and an output port, for coupling signals applied to said first input port to said output port with reference amplitude coupling factor and with reference phase, and for coupling signals from said second input port to said output port with a different amplitude coupling factor and a second phase other than said reference phase;

amplitude splitting means coupled to said source of carrier signal for dividing said carrier signals into at least first and second attenuated carrier signal portions;

first biphase modulation means coupled to said amplitude splitting means for biphase modulating said first signal portion in response to said first information signal to form a first modulated signal portion;

second biphase modulation means coupled to said amplitude splitting means for biphase modulating said second signal portion in response to said second information signal to form a second modulated signal portion;

coupling means coupled to said summing coupler, and to said first and second amplitude modulation means, for coupling said first and second modulated signal portions to said first and second input ports, respectively, of said summing coupler, whereby said summing coupler couples said first and second modulated signal portions together with an amplitude difference dependent upon the difference between said reference amplitude coupling factor and said different amplitude coupling factor, and with a phase difference dependent upon the difference between said reference phase and said second phase, to form said unbalanced quadri-phase shift keyed signal; and wherein said apparatus further comprises:

an amplitude limiter coupled to said modulator for limiting the amplitude of said unbalanced quadri-phase shift keyed signals for reducing said tendency to produce crosstalk.

13. A modulator according to claim 12, wherein said amplitude splitting means divides said carrier signals to produce equal-amplitude first and second attenuated carrier signal portions.

* * * * *